Jan. 19, 1971     D. J. DOWLING     3,555,764
APPARATUS AND METHOD FOR SECURING CLOSURES TO CONTAINER BODIES
Filed Feb. 1, 1967     10 Sheets-Sheet 1

INVENTOR
DANIEL J. DOWLING
BY
Mason, Porter, Diller & Brown
ATTORNEYS

INVENTOR
DANIEL J. DOWLING

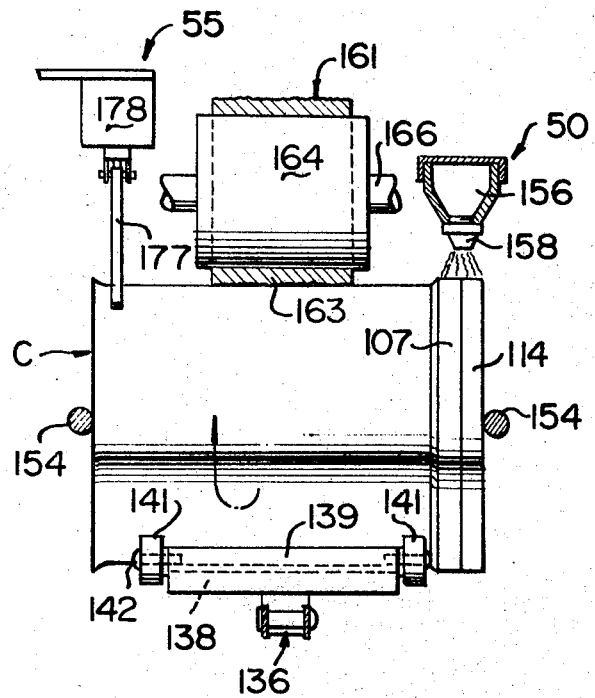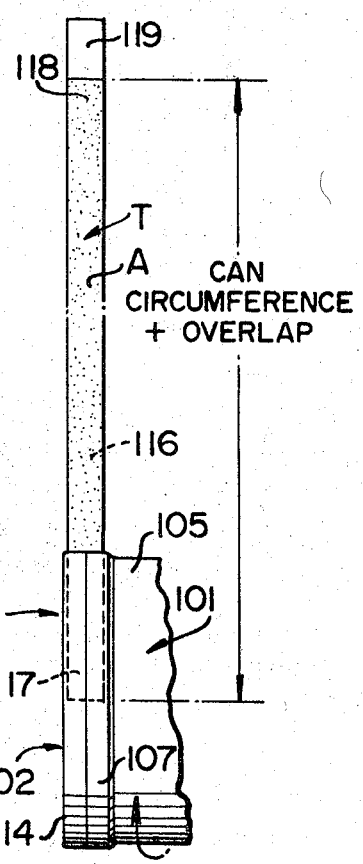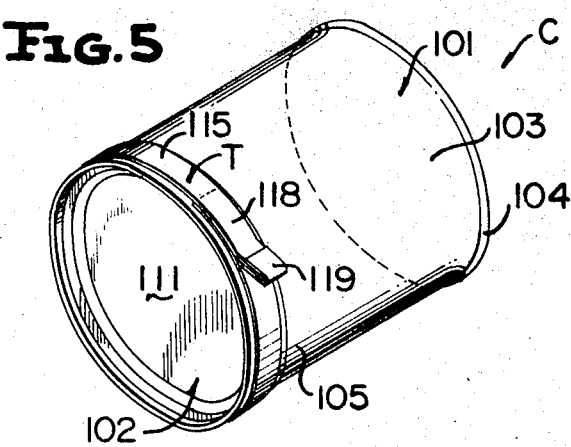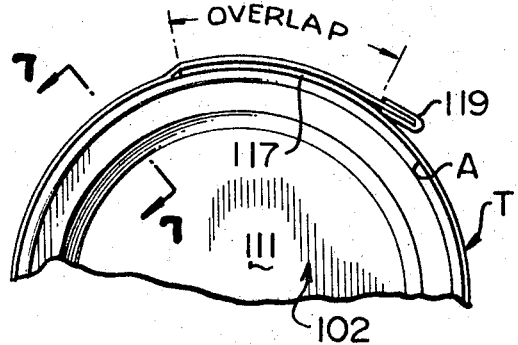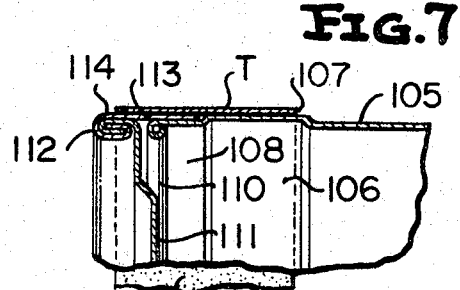

Jan. 19, 1971  D. J. DOWLING  3,555,764
APPARATUS AND METHOD FOR SECURING CLOSURES TO CONTAINER BODIES
Filed Feb. 1, 1967  10 Sheets-Sheet 5

INVENTOR
DANIEL J. DOWLING

BY
Mason, Porter, Diller & Brown
ATTORNEYS

Jan. 19, 1971  D. J. DOWLING  3,555,764
APPARATUS AND METHOD FOR SECURING CLOSURES TO CONTAINER BODIES
Filed Feb. 1, 1967  10 Sheets-Sheet 6
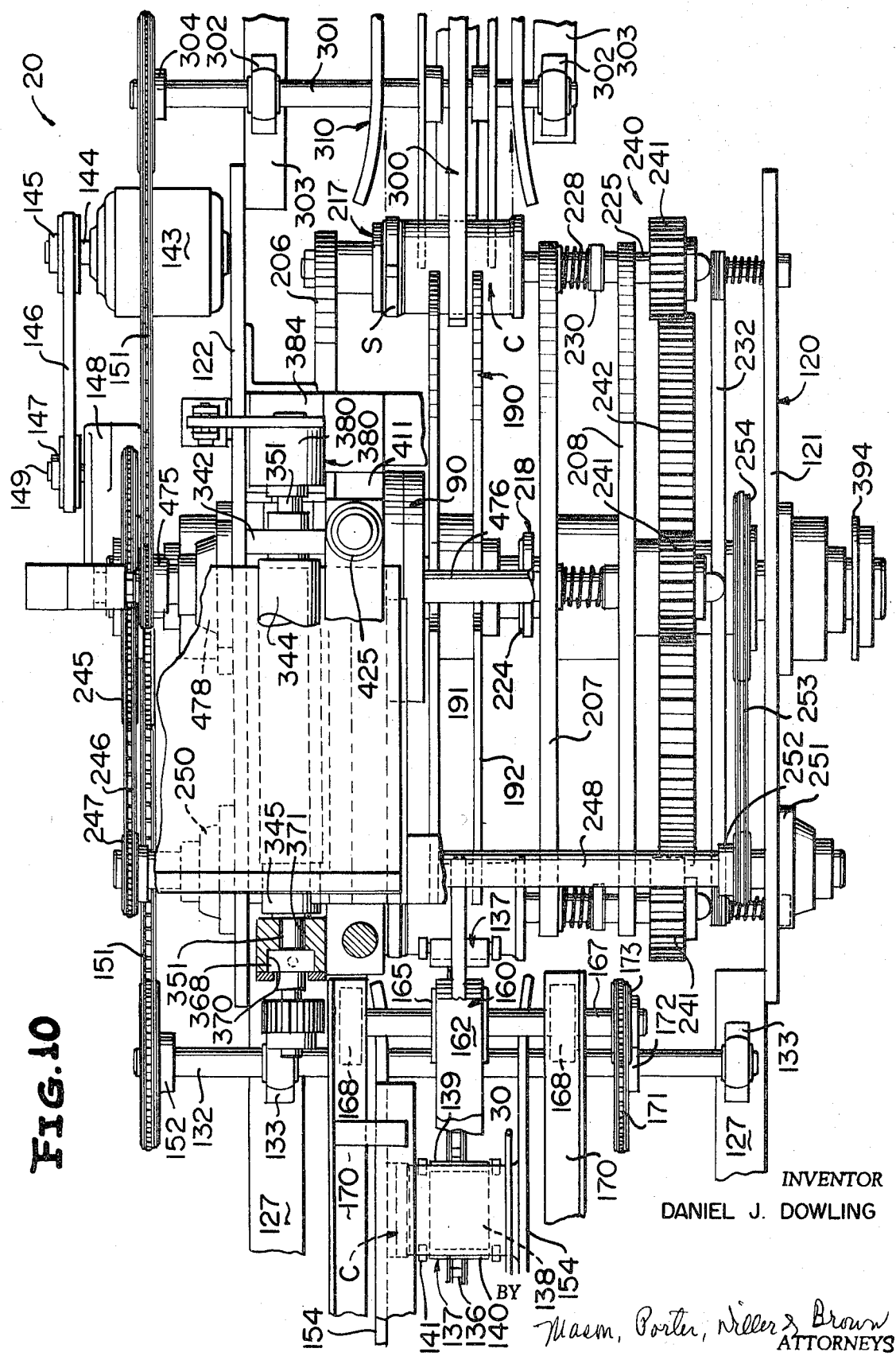
INVENTOR
DANIEL J. DOWLING
BY
ATTORNEYS

INVENTOR
DANIEL J. DOWLING

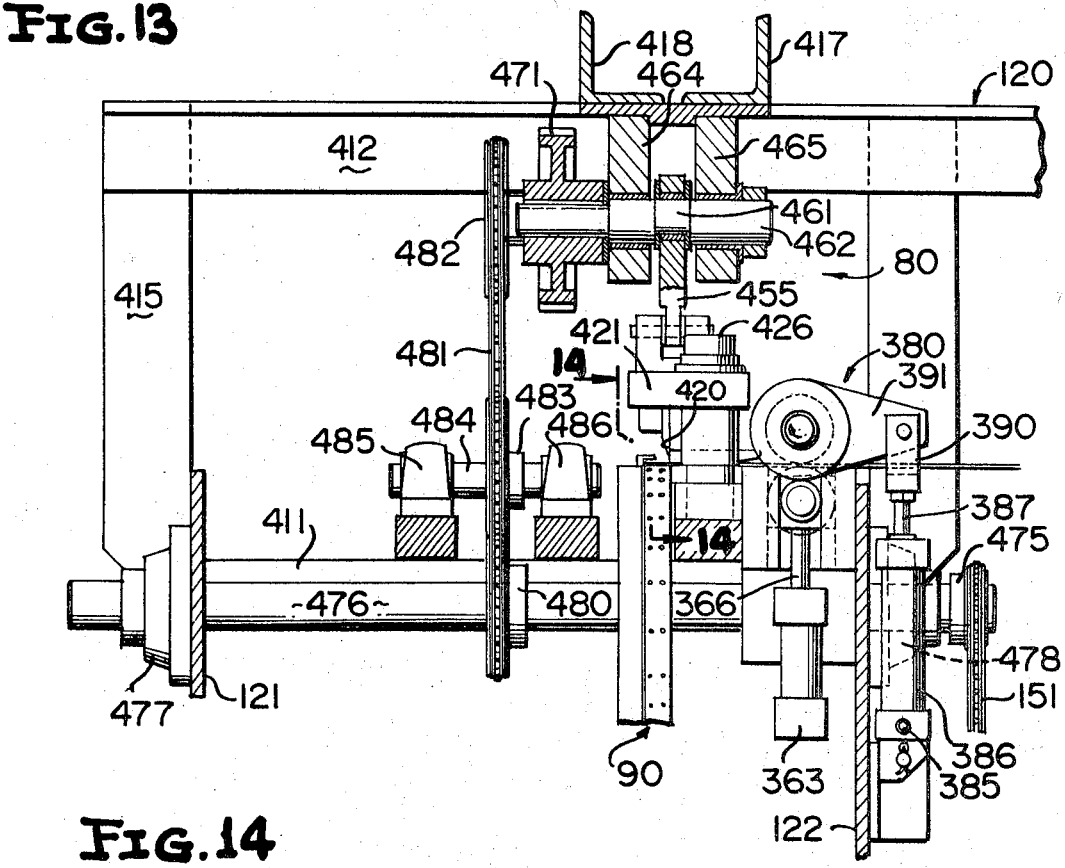
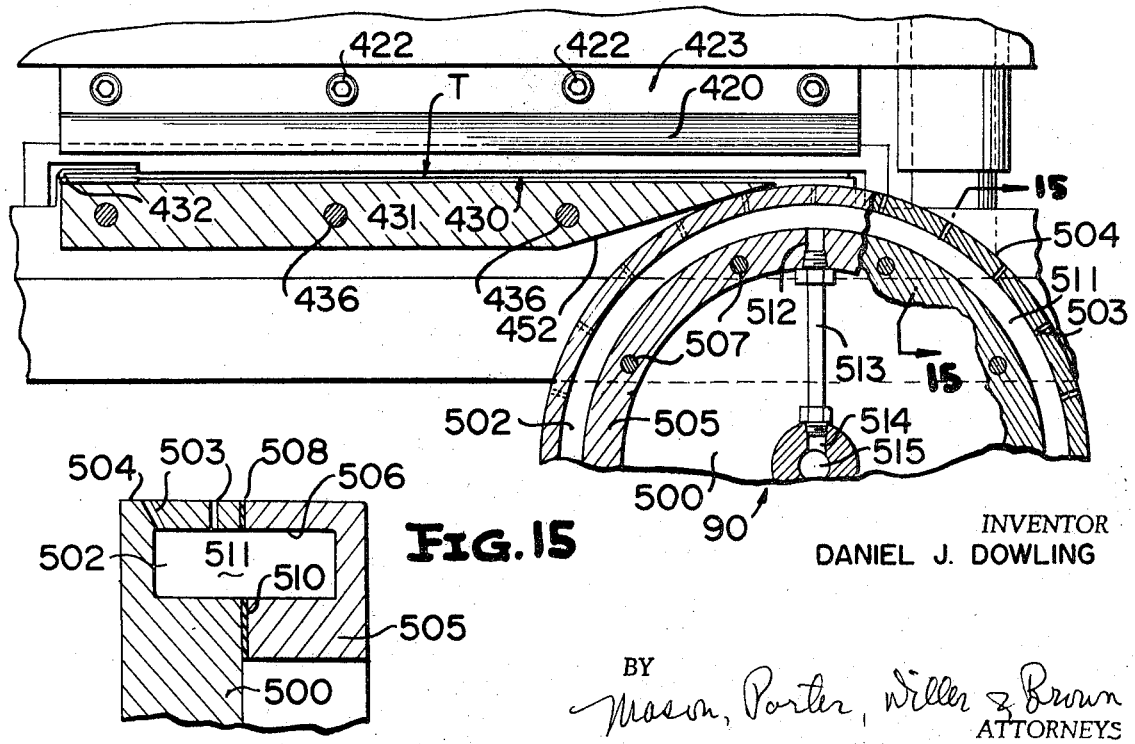

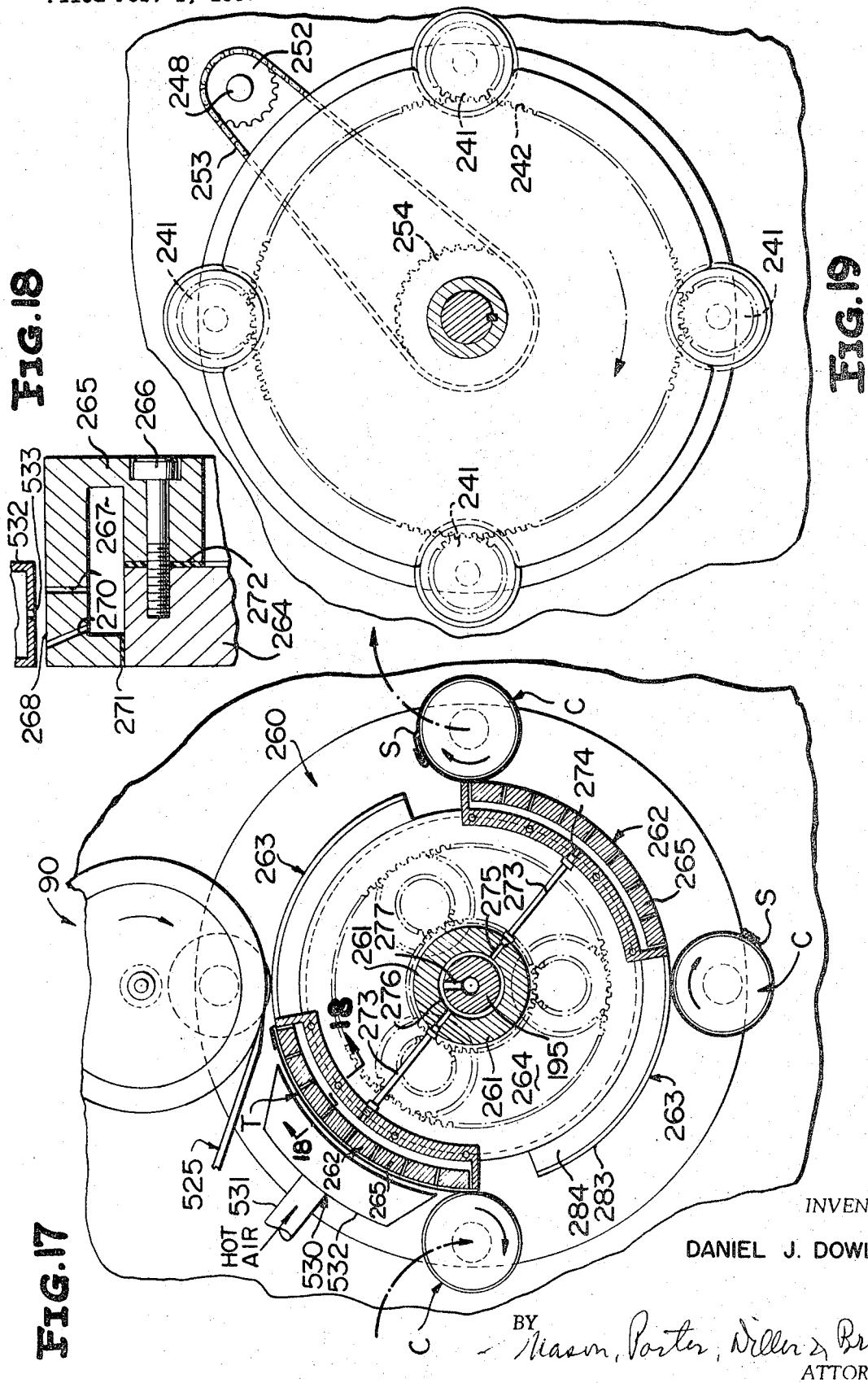

United States Patent Office

3,555,764
Patented Jan. 19, 1971

3,555,764
APPARATUS AND METHOD FOR SECURING
CLOSURES TO CONTAINER BODIES
Daniel J. Dowling, Chicago, Ill., assignor to Continental
Can Company, Inc., New York, N.Y., a corporation of
New York
Filed Feb. 1, 1967, Ser. No. 613,273
Int. Cl. B65b 61/18; B65c 9/02
U.S. Cl. 53—14                                              34 Claims

ABSTRACT OF THE DISCLOSURE

This invention relates to a novel apparatus for and method of securing closures to container bodies, and is particularly directed to a novel apparatus for securing a closure to a container body by means of a relatively narrow securing strip which is applied against and about adjoining peripheral wall portions of the closure and container body. This invention also features a device for attaching a grip portion to the securing strip.

---

A primary object of this invention is to provide a novel apparatus for securing a closure member to a container body member by a strip material member comprising means for transversely severing a strip material member from a sheet material web, means for advancing the members into contiguous relationship, and means for applying the strip material member against and about adjoining peripheral wall portions of the closure and container body members.

A further object of this invention is to provide a novel apparatus of the type immediately above-described including means for securing a narrow strip to a longitudinal edge of the sheet material web prior to severing the strip material member therefrom whereby an end portion of the latter member defines a grip portion of the strip material member which is adapted to be grasped incident to the removal of the strip material member from the peripheral wall portions to disassemble the closure and the container body members.

A further object of this invention is to provide a novel apparatus of the type heretofore described in which means are provided for folding the narrow strip and securely sandwiching the longitudinal edge of the sheet material web between overfolded portions of the folded strip whereby opposite surfaces of the end portion of the strip material member are covered by the strip defining the grip portion of the strip material member.

Yet another object of this invention is to provide a novel apparatus of the type heretofore described in which means are provided for detecting the presence of container body members, and means responsive to the detecting means are provided for preventing the severing of a strip material member from the web.

A further object of this invention is to provide a novel apparatus of the type heretofore described in which the strip material member includes a heat activatable adhesive surface which is brought into contact with the adjoining peripheral wall portions by the applying means, and means are provided for heating at least one of the members prior to the application of the strip material member to the peripheral wall portions to secure the closure and container body members together.

Still another object of this invention is to provide a novel apparatus of the type heretofore described in which means are provided for advancing the sheet material web relative to severing means, the web advancing means including a pair of rolls, means for rotating one of the rolls, and means maintaining the pair of rolls in driving relationship whereby rotation of the one roll imparts rotation to the other of the rolls to advance the sheet material web.

A further object of this invention is to provide a novel apparatus of the type described including means for tensioning the strip material member during the application thereof to the closure and container body members whereby wrinkling and attended misapplication of the strip material member to the closure and container body members is precluded.

Another object of this invention is to provide a novel method of securing together a pair of assembled members having generally mutually coplanar adjoining peripheral wall portions by providing a sheet material web, severing a strip material member from the web, applying the strip material member against and about the adjoining peripheral wall portions of the assembled members, and tensioning the strip material member during the application thereof to the adjoining peripheral wall portions to prevent wrinkling of the strip material member and attended misapplication thereof to the assembled members.

A further object of this invention is to provide a novel method including each of the steps set forth above and in addition securing a narrow strip to a longitudinal edge of the web prior to severing the strip material member therefrom, and transversely severing the strip material member from the sheet material web whereby a portion of the narrow strip defines a grip portion of the strip material member adapted to be grasped incident to the removal of the strip material member from the assembled members to disassemble the latter.

With the above and other objects in view that will hereinafter appear, the nature of the invention will be more clearly understood by reference to the following detailed description, the appended claims and the several views illustrated in the accompanying drawings:

FIG. 3 is an enlarged sectional view taken generally along line 3—3 of FIG. 2 with parts omitted for clarity, and illustrates an assembled can body and closure carried by an upper run of a conveyor, the switch for detecting the presence or absence of a can body, means for rotating the can body about its axis, and a heating mechanism for heating adjoining peripheral wall portions of the can body and closure to which is subsequently applied the securing tape.

FIG. 4 is a fragmentary elevational view of the end of the can body to which the closure is assembled, and illustrates the dimensional relationship between the securing tape and the circumference of the can body.

FIG. 5 is a perspective view of the can body and closure, and illustrates the securing tape maintaining the closure and can body in assembled relationship.

FIG. 6 is an end view of the closure, can body and securing tape of FIG. 5, and more clearly illustrates the overlap between opposite end portions of the securing tape.

FIG. 7 is an enlarged sectional view taken generally along line 7—7 of FIG. 6, and clearly illustrates the cross sectional configuration of the closure and can body.

Figure 2:
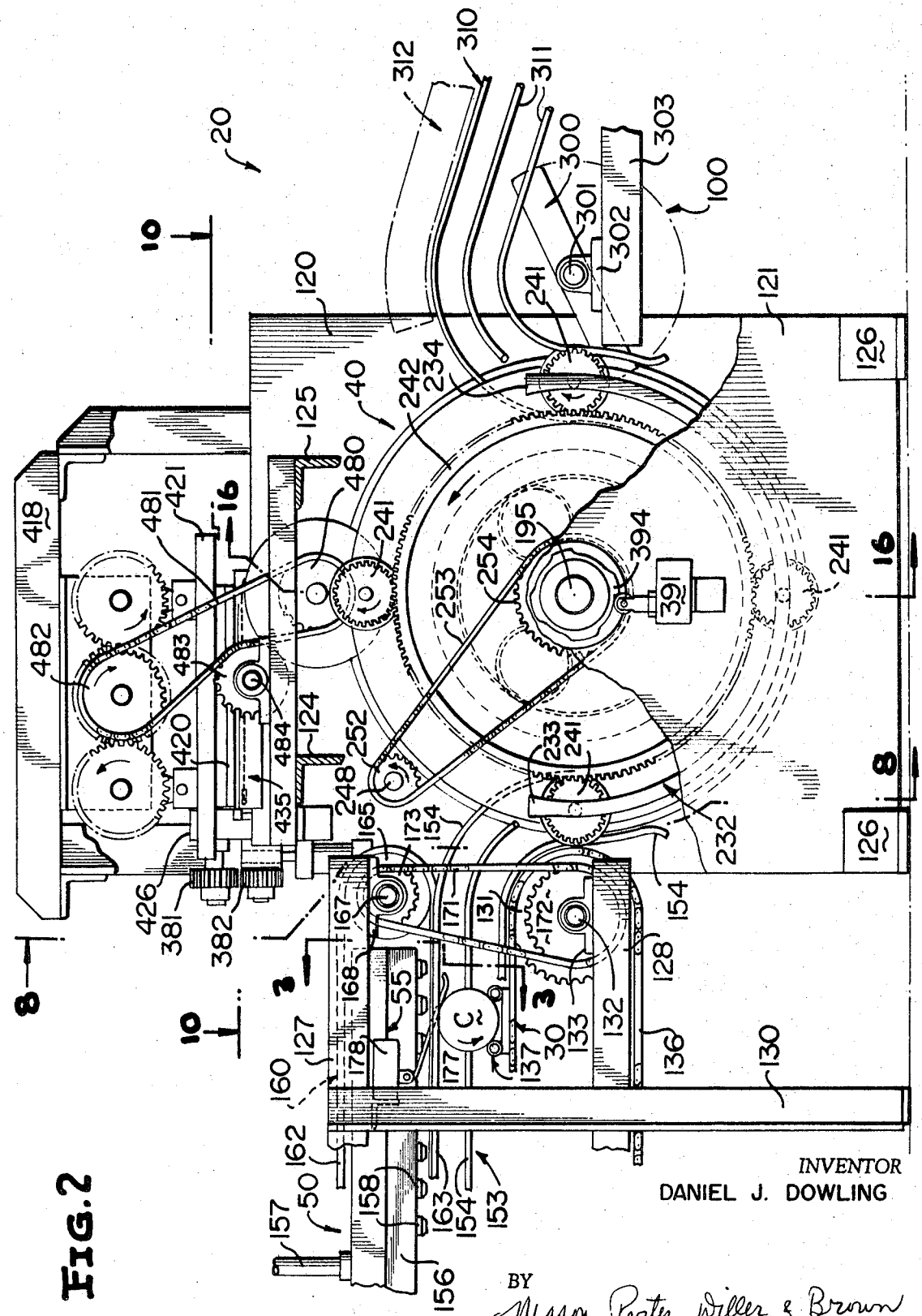
FIG. 2 is a fragmentary front elevational view with parts broken away for clarity of the apparatus of this invention, and illustrates a pair of switches for controlling the severing of the web to form a securing tape, and drive mechanisms for various components of the apparatus.
Figure 8:
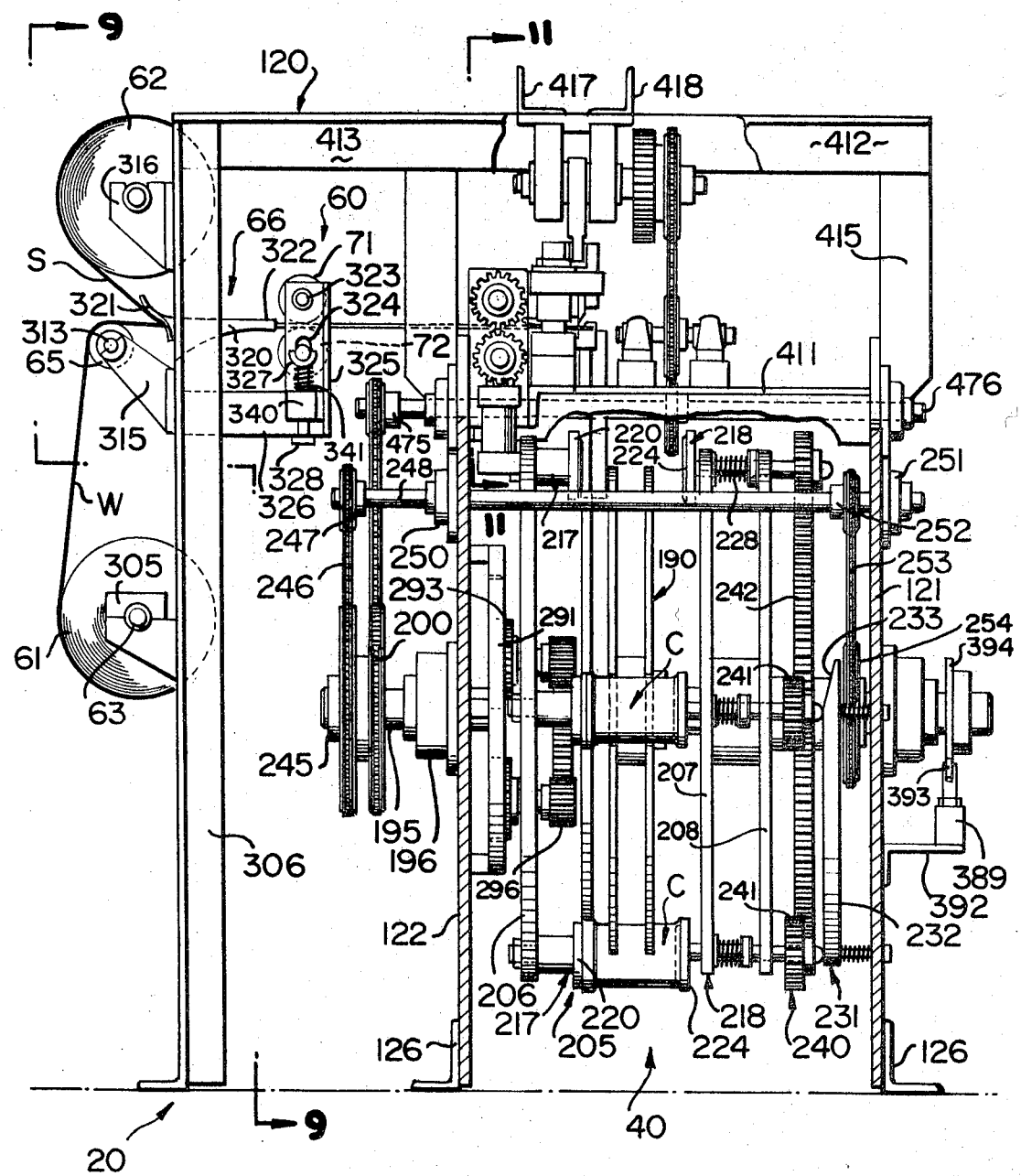

FIG. 8 is an enlarged fragmentary sectional view taken generally along line 8—8 of FIG. 2, with parts broken away for clarity, and illustrates means for sandwiching a longitudinal edge of a sheet material web between overfolded portions of a narrow strip, and means for severing the assembled web and strip to form a scuring tape.

Figure 9:
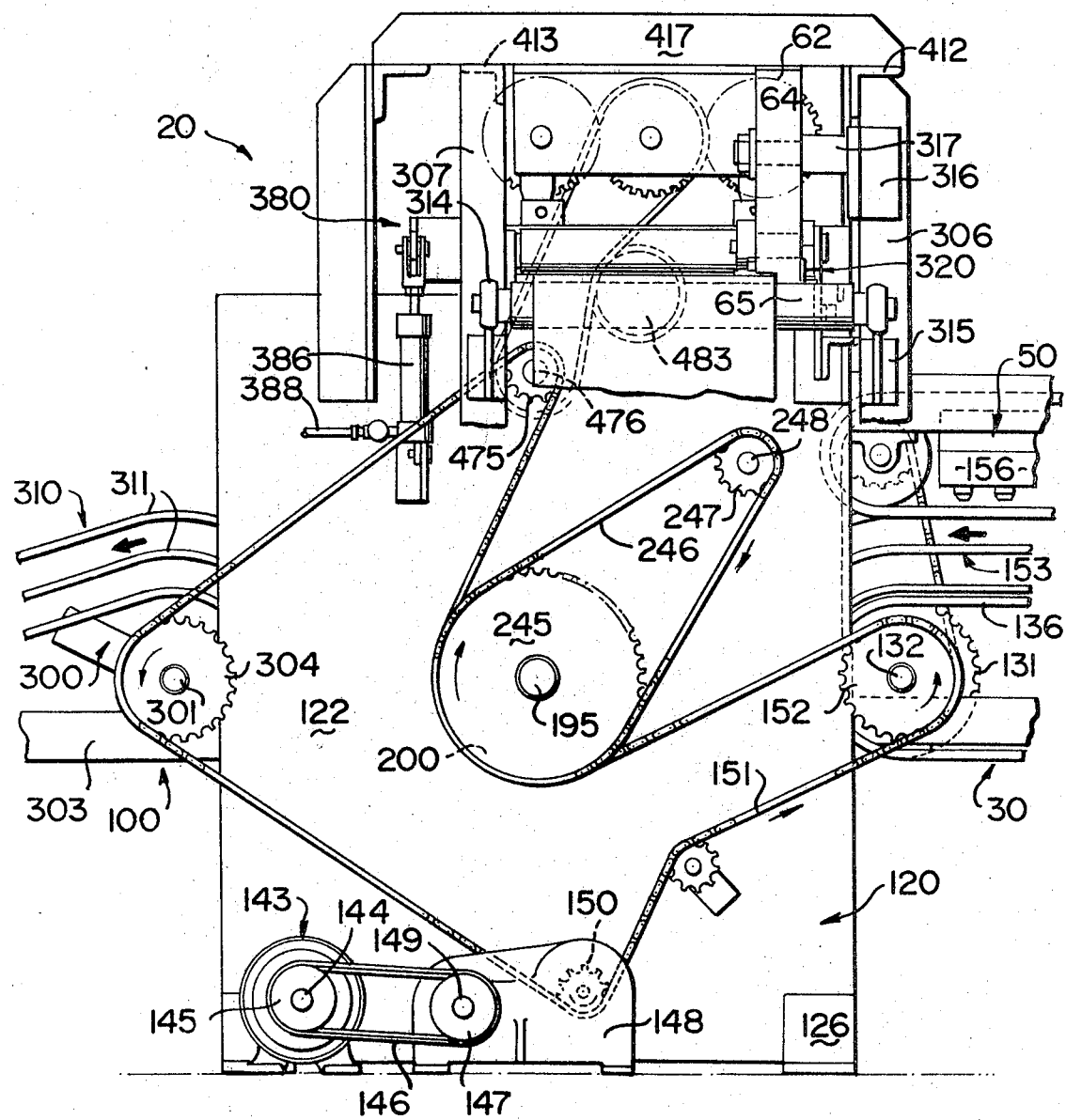

FIG. 9 is a sectional view taken generally along line 9—9 of FIG. 8 with parts removed for clarity, and illustrates the primary drive arrangement for the various moving components of the apparatus.

FIG. 10 is an enlarged fragmentary sectional view with parts broken away for clarity taken generally along line 10—10 of FIG. 2, and illustrates cam actuated gripping members of the tape applying mechanism for gripping assembled closures and can bodies and transporting the same between input and output conveyors.

Figure 11:
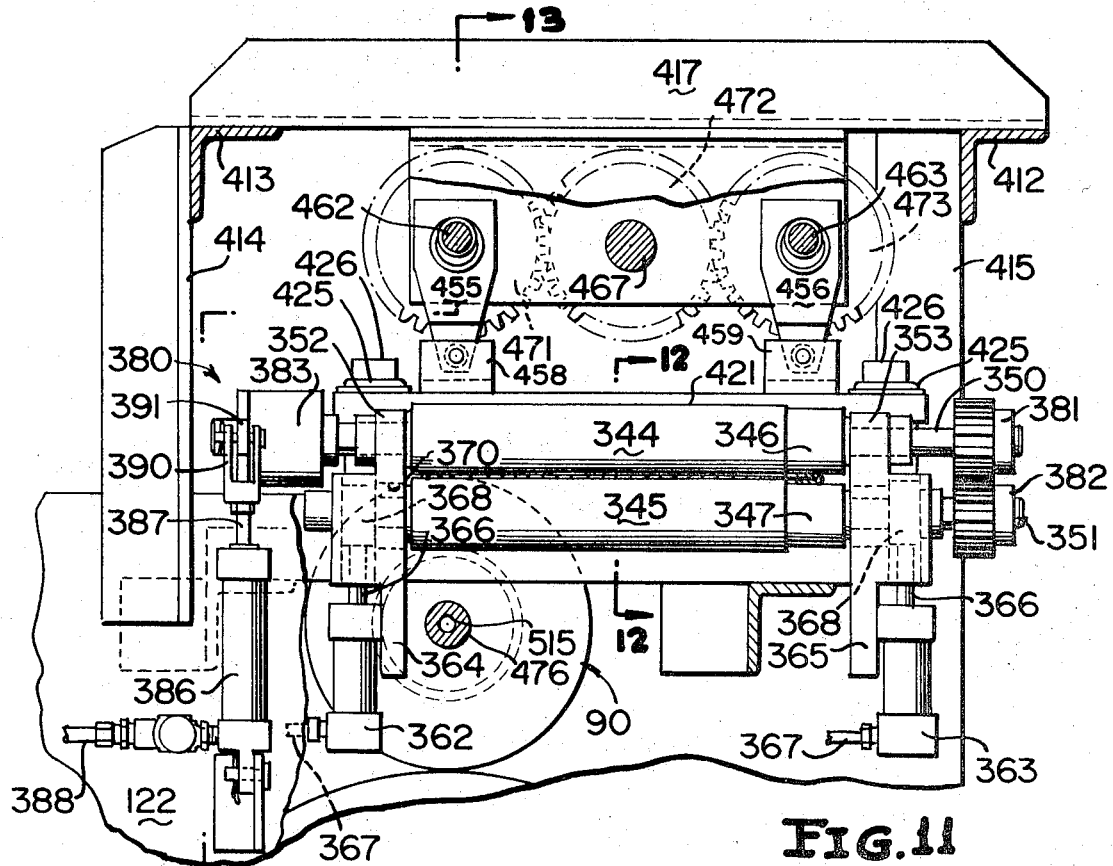

FIG. 11 is an enlarged fragmentary sectional view taken generally along line 11—11 of FIG. 8, and illustrates a pair of feed rolls for the sheet material web, and a severing mechanism for cutting individual securing tapes from the web.

Figure 12:
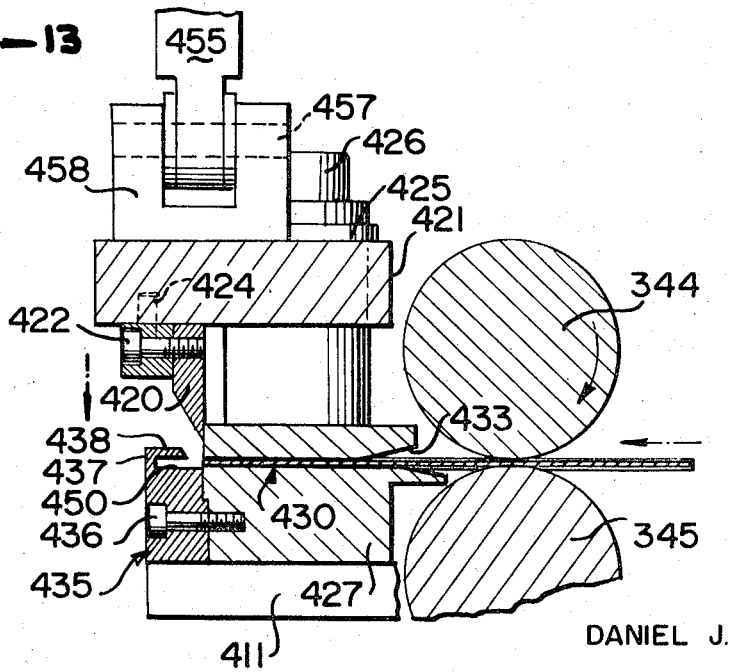

FIG. 12 is an enlarged fragmentary sectional view taken generally along line 12—12 of FIG. 11 and illustrates the position of the web prior to being advanced and severed to form a securing tape therefrom.

FIG. 13 is a fragmentary sectional view taken generally along line 13—13 of FIG. 11, and illustrates a vacuum transport mechanism for transporting each individually severed securing tape from the severing mechanism to the tape applying mechanism.

FIG. 14 is an enlarged fragmentary sectional view taken generally along line 14—14 of FIG. 13, and more clearly illustrates the vacuum transport mechanism and the underlying relationship thereof to a portion of the severing mechanism.

FIG. 15 is a highly enlarged fragmentary sectional view taken generally along line 15—15 of FIG. 14, and illustrates a vacuum chamber and vacuum ports of the vacuum transport mechanism.

Figure 16:
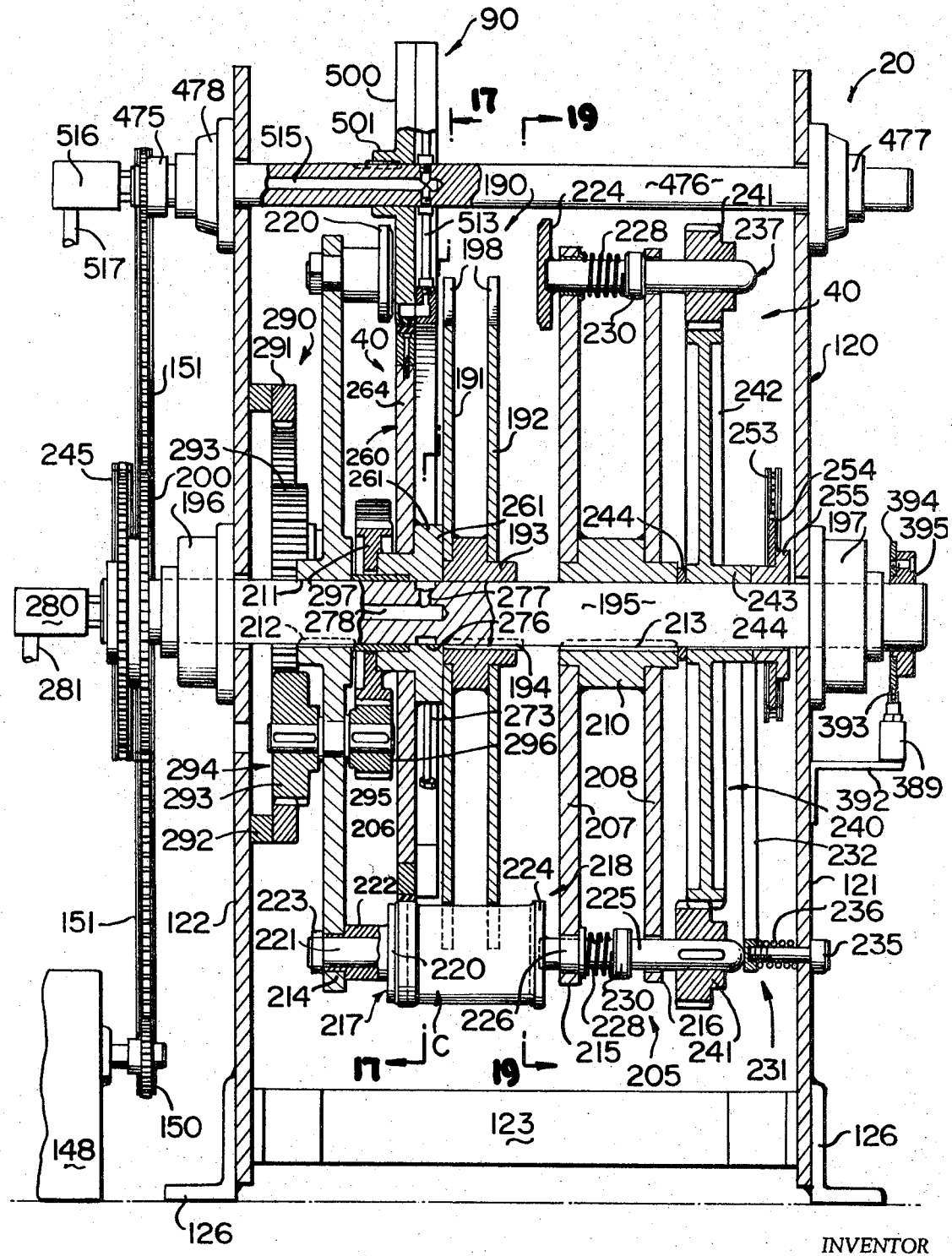

FIG. 16 is an enlarged fragmentary sectional view taken generally along line 16—16 of FIG. 2 with several parts broken away and shown in section for clarity, and illustrates means for rotating the can bodies during the passage thereof through the tape applying mechanism, and means for removing the securing tape from the vacuum transport mechanism and applying the same to adjoining peripheral wall portions of a can body and closure.

FIG. 17 is a fragmentary sectional view taken generally along line 17—17 of FIG. 16, and illustrates a tape applying and pressing member of the tape applying mechanism, and the progressive movement of can bodies and closures through the tape applying mechanism.

FIG. 18 is a highly enlarged fragmentary sectional view taken generally along line 18—18 of FIG. 17, and illustrates a vacuum chamber and associated ports for maintaining a securing strip upon the tape applying and pressing member.

FIG. 19 is a sectional view taken generally along line 19—19 of FIG. 16, and more clearly illustrates the drive mechanism for rotating the can body gripping members.

Figure 1:
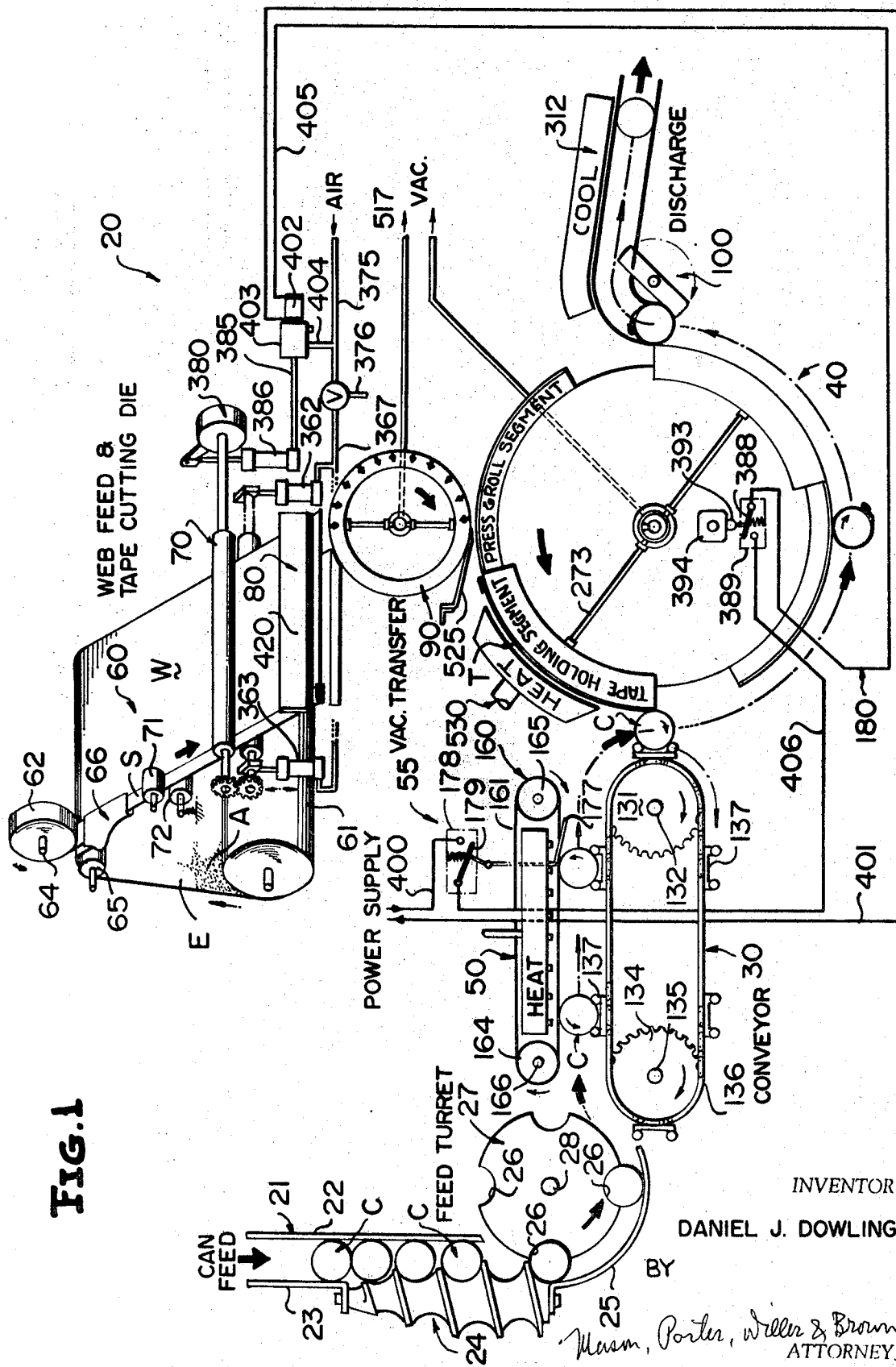
FIG. 1 is a highly diagrammatic front view of a novel apparatus constructed in accordance with this invention, and illustrates means for transversely shearing a web to form a securing tape, means for transferring the securing tape to a tape applying mechanism, and means for advancing assembled closures and can bodies to the tape applying mechanism.

A novel apparatus constructed in accordance with this invention for fastening together a closure and a container body is fully diagrammatically illustrated in FIG. 1 of the drawings, and is generally referred to by the reference numeral 20. The apparatus 20 includes a feed chute 21 defined by a pair of generally vertical walls 22, 23. A timing screw 24 having an axis disposed in a generally vertical plane is journalled between the walls 23 and an arcuate wall 25. The timing screw 24 is driven by conventional means to synchronize the gravity feed of assembled can bodies and closures, generally referred to by the reference characters C, to individual pockets 26 of a feed turret 27. A horizontally disposed drive shaft 28 of the feed turret 27 is similarly driven in a conventional manner (by means not shown) and the drive for both the feed screw 24 and the turret 27 are so synchronized as to deposit one of the assembled can bodies and closures C in each of the pockets 26.

An input conveyor mechanism, generally referred to by the reference numeral 30, is positioned to receive the assembled closures and can bodies C from the feed turret 27 and transfer the same to a tape applying mechanism 40. The particular construction of the input conveyor 30 and the tape applying mechanism 40 will be more fully described hereafter. However, it is to be noted that during the transfer of the assembled closures and can bodies by the conveyor 30 a heating mechanism 50 heats the closures and can bodies C while a detecting mechanism 55 determines the presence or absence of the closures and can bodies C for a purpose to be described more fully hereafter.

The apparatus 20 also includes a tape forming mechanism 60 for forming a securing tape T from a relatively wide sheet material web W and a relatively narrower strip S of sheet material drawn from respective rolls 61, 62 supported by respective generally horizontally disposed shafts 63, 64. The web W drawn from the roll 61 is guided about the periphery of a guide roll 65 and through a forming mechanism 66. As the web W is drawn through the forming mechanism 66, the strip S similarly is drawn through the forming mechanism 66 and folded in such a manner that a longitudinal edge portion E of the web W is sandwiched between overfolded portions (unnumbered) of the strip S.

A feed mechanism 70 intermittently draws the assembled web W and folded strip S through pressure rolls 71, 72 which urge adhesive surfaces of the edge portion E and the strip S into intimate bonding relationship. Thereafter the web and strip are severed by a shearing mechanism 80 into the individual tapes T which are transferred from the shearing mechanism 80 to the tape applying mechanism 40 by a vacuum transfer mechanism 90. Each securing tape T is applied against and wrapped about adjoining peripheral wall portions of the closures and can bodies C during the passage thereof through the tape applying mechanism, and are subsequently discharged from the tape applying mechanism 40 by a discharge mechanism 100.

Before describing the apparatus 20 in detail, attention is now directed to FIGS. 4 through 7 of the drawings and the details of the assembled closure and container body C and the securing tape T. Each assembled closure and container or can body C is defined by a can body generally referred to by the reference numeral 101, and a closure 102. The can body 101 is constructed from metalic material and includes an end portion 103 having a radially outwardly directed flange 104. An opposite end portion 105 (FIG. 7) of the can body 101 includes a relatively shallow, outwardly directed, circumferential bead 106 having an exterior peripheral wall or surface 107. The bead 106 integrally merges with an uppermost annular wall 108 which in turn terminates in a radially inwardly, downwardly and outwardly directed curl 110. The curl 110 defines a mouth (unnumbered) of the can body 101 through which contents (not shown) packaged in the can body are removed upon eventual removal of the securing tape T as will be more apparent hereafter.

The closure 102 includes an end panel 111 joined by a conventional double seam 112 (FIG. 7) to a peripheral skirt 113 having an exterior wall or surface portion 114 of a circumference substantially identical to the circumference of the exterior wall portion 107 of the bead 106. The wall portions 107, 114 are thereby in generally mutually coplanar concentric adjoining relationship when assembled. In addition, the can body 101 and the closure 102 are preferably maintained frictionally assembled prior to the application of the securing tape T thereto by frictional purchase between the skirt 113 of the closure 102 and the annular wall 108 of the can body 101.

The securing tape T is an elongated rectangular element having an exterior surface 115 and an interior surface 116 which is coated with a heat activatable adhesive A which is indicated by the stippling in FIG. 4 of the drawings. The securing tape T includes a leading end portion 117 which is the first end portion of the securing tape T to be placed into contact with the surfaces 107, 114 (FIG. 4) and a trailing end portion 118 which terminates in a gripping portion 119. The gripping portion 119 is formed from the material of the strip S, as will be more apparent hereafter. The length of the securing tape T is also somewhat longer than the circumference of the wall portions 107, 114 which forms an overlap of the securing tape end portions 117, 118 as is best illustrated in FIGS. 5 and 6 of the drawings.

Referring now to FIGS. 1, 2, 8 through 10 and 16 of the drawings, the apparatus 20 includes a framework, generally designated by the reference numeral 120 which includes an upstanding front plate 121 (FIGS. 2 and 16), an upstanding rear plate 122 (FIG. 9), and a plurality of transverse tie bars 123, 124, 125, etc., fastened between the plates 121, 122 as by, for example, welding or similar conventional fastening means. Generally L-shaped brackets 126 (FIGS. 2, 9 and 16) are provided with apertures (not shown) for securing the framework 120 to a supporting surface (unnumbered).

A pair of horizontal supports 127, 128 (FIG. 2) are secured to each of the plates 121, 122 (FIGS. 2 and 10), and a vertical support 130 (FIG. 2) is secured to each of the supports 127, 128 in spaced relationship to the respective vertical plates 121, 122. A sprocket 131 (FIGS. 2 and 9) fixed to a shaft 132 is journalled for rotation by journal blocks 133 fixed to each of the horizontal supports 128, as is readily apparent from FIG. 2 of the drawings. A similar sprocket 134 is journalled at an opposite end of the horizontal supports 128 by a shaft 135 (FIG. 1) and respective journal blocks (not shown). The sprockets 131, 135 partially define the conveyor mechanism 30 which includes a conveyor chain 136. A plurality of can body holders 137 are identically spaced along the runs (unnumbered) of the conveyor chain 136. Each of the can body holders 137 is identical and includes a base 138 (FIGS. 3 and 10), and a pair of spaced upstanding shallow arms 139, 140. The base 138 and arms 139, 140 impart a generally shallow U-shaped configuration to each of the can body holders 137 as viewed in side elevation (FIG. 1). Fasteners (not shown) passing through the bases 138 of each of the can body holders 137 secure the same to the chain 136 of the conveyor mechanism 30.

Identical rollers 141 are freely journalled by headed studs 142 to the ends of each of the arms 139, 140, as is best illustrated in FIG. 10 of the drawings. Each of the assembled closures and can bodies C are thereby supported for rotation about their respective axes by means of the rollers 141, as is best illustrated in FIGS. 1 and 3 of the drawings.

The conveyor mechanism 30 is driven in synchronism to the movement of the turret 27 (FIG. 1) in such a manner that an assembled closure and can body C is delivered from one of the pockets 26 of the turret 27 to an associated one of the can body holders 137 of the conveyor mechanism 30, as is readily apparent from FIG. 1 of the drawings. The conveyor mechanism 30 is driven by means of a motor 143 (FIG. 9) which is conventionally supported adjacent the rear plate 122 of the framework 120. The motor 143 includes a drive shaft 144 and a pulley 145 about which is entrained a pulley belt 146. The pulley belt 146 is also entrained about a pulley 147 of a reduction gear box 148. Rotation of the pulley 147 rotates an input shaft 149 of the reduction gear box 148 which in turn drives various mesh gears (not shown) which in turn rotate a sprocket 150 counterclockwise, as viewed in FIG. 9 of the drawings. A drive chain 151 is entrained about the sprocket 150 and a drive sprocket 152 fixed to the shaft 132 of the conveyor mechanism 30. In this manner the closures and can bodies C in the can body holders 137 of the conveyor mechanism 30 are advanced from left-to-right in FIG. 1 of the drawings toward the tape applying mechanism 40.

During the advancement of the can bodies and closures C by the conveyor mechanism 30, guide means are provided for preventing the closures and can bodies C from inadvertently or accidentally falling from the can body holders 137. The guide means are generally referred to by the reference numeral 153 and include a plurality of generally parallel guide bars 154 which are suitably secured to the framework 120 and are preferably disposed above and at each axial end of the closures and can bodies C carried by the can body holders 137 (FIGS. 2 and 3).

During the time the closures and can bodies C are being conveyed by the conveyor mechanism 30 toward the tape applying mechanism 40, the heating mechanism 50 (FIGS. 1 and 2) directs heat toward the surfaces 107, 114 (FIG. 7) of the can body and closure C to heat the same in order to activate the heat activatable adhesive A (FIG. 4) of the securing tape T as the latter is applied in a manner which will be more apparent hereafter. The heating mechanism 50 includes a main header 156 which overlies the upper run (unnumbered) of the conveyor chain 136 and is of a length slightly less than the distance between the shaft 132, 135 of the conveyor mechanism 30 (FIG. 1). The main header 156 is secured to cross ties (not shown) between the horizontal supports 127 of the framework 120. The main header includes a chamber or manifold (not shown) into which is conducted gas or a similar combustible media by means of a conduit 157 (FIG. 2). A plurality of burner heads 158 are in fluid communication with the interior of the main header 156, and the burner heads 158 are positioned to direct flames toward the juncture between the surfaces 107, 114, as is clearly illustrated in FIG. 3 of the drawings.

The heating mechanism 50 also includes means 160 (FIGS. 1, 2 and 10) for rotating the closures and can bodies C as the same are advanced toward the tape applying mechanism 40. The means 160 includes a rotatable belt 161 having an upper run 162 and a lower run 163 disposed to engage each can body 101 (FIGS. 2 and 3). The belt 161 is entrained about pulleys 164, 165 which are in turn fixed to respective shafts 166 (FIG. 1), 167 (FIGS. 2 and 10). The shaft 167 is journalled for rotation in journal blocks 168 (FIG. 10) secured to the underside of horizontal supports 170 of the framework 120. The belt 161 is driven by means of a sprocket chain 171 (FIGS. 2 and 10) entrained about a sprocket 172 fixed to the shaft 132 and a sprocket 173 fixed to the shaft 167. As is readily apparent from FIG. 2 of the drawings, the sprocket 173 is rotated clockwise to impart a right-to-left movement to the lower run (unnumbered) of the belt 161 while the upper run (unnumbered) of the chain conveyor 136 is moving from left-to-right. Due to this relative movement between the upper and lower runs of the respective mechanisms 30, 160 and the contact between the lower run of the belt 161 and the can bodies 101, the latter are continually rotated in a counterclockwise direction as viewed in FIGS. 1 and 2 of the drawings The rollers 141 of the can body holders 137 permit the relatively frictionless rotation of the closures and can bodies C in a manner clearly apparent from FIG. 2 of the drawings.

The detecting mechanism 55 is provided for determining the presence or absence of closures and can bodies C to permit the formation of a securing tape T if a closure and can body C is present but preventing the formation of a securing tape in the absence of a closure and can body. The detecting mechanism 55 includes a switch arm 177 (FIGS. 1 and 2) which projects outwardly of a switch housing 178, the latter being in turn fixed to one of the supports (unnumbered) of the framework 120. The switch arm 177 forms a portion of an electrical circuit of the apparatus 20 which is generally designated by the reference numeral 180. The switch arm 177 of the detecting mechanism 155 normally projects downwardly into the path of oncoming closures and container bodies C as is readily apparent from FIG. 3 of the drawings. As each closure and can body contacts and pivots the switch arm 177 a corresponding contact 179 (FIG. 1) of the circuit 180 is closed. The closing of the contact 179 in conjunction with the simultaneous closing of another contact of the circuit 180 to be described hereafter energizes the feed mechanims 70 to advance the web W and strip S to the shearing mechanism 80 which in turn forms a securing tape T, as will be more apparent hereafter.

The movement of the assembled closures and can bodies C (hereinafter referred to as cans) by the conveyor mechanism 30 is synchronized with the operation of the tape-applying mechanism 40 which includes a can-holding turret 190 (FIG. 16). The can-holding turret 190 includes a pair of generally circular plate members 191, 192 fixed by welding to a common hub 193 (FIG. 16) which is in turn fixed by a slot and keyway connection 194 to a main shaft 195 of the apparatus 20. The main shaft 195 is rotatable in journals 196, 197 fixed to the respective plates 121, 122 of the framework 120. A plurality of aligned generally semi-circular slots 198 are formed in the plate members 191, 192 in equal angular spaced relationship about the periphery thereof. The slots 198 define pockets for receiving the cans C as the same leave the holders 137 and are guided by the guide means 153 (FIG. 2) into the tape-applying mechanism 40.

The can-holding turret 190 is moved in synchronism with the conveyor mechanism 30 by means of the main drive chain 151 (FIG. 9) which is entrained about a sprocket 200 (FIG. 8) fixed to the main shaft 195. The main drive chain 151 and the sprocket 200 thereby impart clockwise rotation to the main shaft 195 and the can-holding turret 190, as viewed in FIG. 9 of the drawings, and counterclockwise rotation to the same elements as viewed in FIGS. 1 and 2 of the drawings.

Each can C is clamped or gripped by a gripping mechanism 205 (FIG. 16) of the tape-applying mechanism 40. The gripping mechanism 205 includes three generally circular plates 206, 207 and 208 with the latter two plates being secured by welding or similar conventional means to a common hub 210. A hub 211 of the plate 206 and the hub 210 of the plates 207, 208 are each fixedly secured by respective key and keyway connections 212, 213 to the main shaft 195.

The plates 206, 207 and 208 are provided with aligned apertures 214, 215 and 216 respectively. There are as many apertures 214 through 216 as there are pockets or slots 198 in the can holding turret 190, and the apertures 214 through 216 correspond in arcuate spacing to the pockets 198. A plurality of axially fixed but rotatable mandrels 217 are associated with the plate 206 while a plurality of axially movable and rotatable mandrels 218 are associated with the plates 207, 208 of the gripping mechanism 205.

Each of the mandrels 217 is identical and includes a head 220 which is contoured to engage within the recess of the closure 102, as is best illustrated in FIGS. 8, 10 and 16 of the drawings. Each head includes an integral stem 221 (FIG. 16) which is in turn rotatably received in a bushing 222 fixed in each of the apertures 214. A nut 223 secured to a threaded end portion (unnumbered) of the stem 221 maintains each of the axially fixed mandrels 217 secured to the plate 206.

Each of the axially movable mandrels 218 is similar to the mandrels 217, and includes a head 224 contoured to engage with the interior surface of the flange 104 of each of the cans C, as is best illustrated in FIGS. 8, 10 and 16 of the drawings. A stem 225 is fixed to each head 224 and passes through an associated bushing 226 in each of the apertures 215. The stem 225 of each mandrel 218 also passes through an associated one of the apertures 216 of the plate 208 (FIG. 16). A spring 228 surrounds the stem 225 of each of the mandrels 218 and is housed between an associated one of the bushings 226 and a collar 230 of each stem. The springs 228 normally bias the heads 224 of the mandrels to an open position, as is best illustrated by the uppermost mandrel 218 of FIG. 16 of the drawings. In this position the heads 220, 224 are spaced apart a sufficient distance to permit each can C to be introduced into a pocket 198 of the can-holding turret 190. However, as each can C is introduced into an associated one of the pockets 198 after leaving the guide mechanism 153 the mandrels 217, 218 are closed by closing means 231 to securely grip each can C between opposed mandrel heads 220, 224 as is best illustrated in the lower portion of FIG. 16 of the drawings.

The closing means 231 of the tape-applying mechanism 40 comprises a generally semi-cylindrical cam plate 232 (FIG. 2) having an entrance end portion 233 and an exit end portion 234. The cam plate 232 is supported in spaced relationship to the plate 121 (FIG. 16) by means of a plurality of headed studs 235 threadably received in threaded bores (unnumbered) of the cam plate 232. A compression spring 236 surrounds each of the headed studs 235 and is disposed between the cam plate 232 and the upstanding plate 121 of the framework 120.

An end portion 237 (FIG. 16) of each of the stems 225 of the mandrels 218 is rounded and defines a cam follower which is cooperative with the cam plate 232 to effect axial movement of the mandrel heads 234, as will be readily apparent from FIGS. 2, 8 and 16 of the drawings to which attention is now directed. As is best illustrated in FIG. 8 of the drawings, uppermost mandrels 217, 218 are biased to an open position by an associated spring 228 prior to the introduction of a can C between the heads 220, 224 thereof. As the main shaft 195, the can holding turret 190 and the gripping mechanism 205 rotate in a counterclockwise direction as viewed in FIG. 2 of the drawings a can C is deposited in one of the pockets 198 of the can holding turret 190 just prior to the mandrels associated therewith reaching the entrance end portion 233 of the cam plate 232. The entrance end portion 233 of the cam plate 232 is inclined to cause the rounded end portion 237 of each of the mandrel stems 225 to move from right-to-left as viewed in FIG. 8 of the drawings. This movement of the stems 225 compresses the springs 228 and urges the heads 220, 224 into clamping engagement with the cans C, as is best illustrated by the lowermost two cans C in FIG. 8 and the lowermost can C in FIG. 16 of the drawings. After the can holding turret 190 and the gripping mechanism 205 has rotated approximately 180 degrees, the cam follower portion 237 of an associated mandrel 218 reaches the exit end portion 234 (FIG. 2) of the cam plate 232. The exit end portion 234 is sloped identically to the entrance end portion 233 whereby each mandrel stem 225 is urged from left-to-right, as viewed in FIGS. 8 and 16 by the force of the compression springs 228 until the cam followers 237 leave the cam plate 232. At this point, the cans C are discharged from the tape applying mechanism 40 by the discharge mechanism 100 (FIG. 1), as will be more fully described hereinafter.

The cans C are not only rotated partially about the axis of the main shaft 195 of the tape applying mechanism 40, but are also rotated about each individual can axis by can body rotating means generally referred to by the reference numeral 240. The can body rotating means 240 includes a plurality of identical pinion gears 241 (FIGS. 8, 10, 16 and 19) with one pinion gear 241 being keyed fixedly to an associated one of each of the stems 225 of the mandrels 218. As is best illustrated in FIG. 19 of the drawings, there are preferably four such pinion gears 241, one being associated with mandrel 218, an associated mandrel 217 and a pocket 198 of the can holding turret 190. Each pinion gear 241 is in mesh with a drive gear 242 (FIGS. 2, 16 and 18) which is freely journalled for rotation on the main shaft 195 by means of a hub 243. A generally annular bearing 244 (FIG. 16) is positioned between the hubs 210 and 243.

The drive gear 242 of the can body rotating mechanism 240 is driven or rotated by the main drive chain 151 (FIG. 9) which, as was heretofore noted, rotates the main shaft 195 through the sprocket 200. Another sprocket 245 is fixed to the main drive shaft 195 and a drive chain 246 is in mesh with the sprocket 245 and a sprocket 247 fixed to a shaft 248. The shaft 248 is journalled for rotation in journal blocks 250, 251 (FIG. 10) in the plates 122, 121, respectively, of the framework 120. A sprocket 252 (FIGS. 10 and 19) is fixedly secured to the shaft 248 adjacent the upstanding plate 121. A drive chain 253 is entrained about the sprocket 252 and a sprocket 254 having a hub 255 (FIG. 16) which is welded or otherwise secured to the hub 243 of the drive gear 242.

With the main drive chain 151 driving the sprocket 245 in a clockwise direction (FIG. 9) the chain 246 rotates the shaft 248 through the sprocket 247 in a similar clockwise direction in FIG. 9. As viewed in FIG. 2 of the drawings, the shaft 248 is rotating counterclockwise and causes similar counterclockwise rotation of the sprocket 254 and the drive gear 242. The counterclockwise rotation of the drive gear 242 imparts clockwise rotation to each of the pinion gears 241, the mandrels 217, 218 and the cans C clamped therebetween. The cans C are thereby bodily rotated in a counterclockwise direction about the axis of the main shaft 195 and rotated about their individual axes in a clockwise direction as viewed in FIG. 2 of the drawings during the movement of the can bodies through the tape applying mechanism 40.

Each securing tape T (FIG. 1) is applied to an associated can by a tape applying member, generally referred to by the reference numeral 260 of the tape applying mechanism 40. The tape applying member 260 is best illustrated in FIGS. 16 and 17 of the drawings, and is mounted for rotation about the main shaft 195 by a hub 261. The tape applying member 260 is formed of two substantially identical halves (unnumbered) each of which includes a tape transferring and applying section 262 and a tape pressing section 263. The function of the tape transferring and applying sections 262 is to receive a strip of securing tape T from the vacuum transfer mechanism 90 (FIG. 1) and transfer and apply the same to an associated can C during the movement thereof through the tape applying mechanism 40. The function of the tape pressing section 263 is to press the transferred securing tape into intimate engagement with the cans C after the tapes have been completely wrapped about the cans.

The tape applying member 260 includes a generally annular member 264 to which is secured the sections 262, 263. Each tape applying section 262 is defined by a generally arcuate member 265 secured to the annular member 264 by a plurality of bolts 266 (FIG. 18). Each arcuate member 265 defines a vacuum chamber or housing 267 which is placed in fluid communication with a tape carrying surface 268 by means of a plurality of ports or passages 270. Seals 271, 272 (FIG. 18) maintain adjoining surfaces of the arcuate members 265 and the annular member 264 in sealing engagement.

The chamber 267 of each of the arcuate members 265 of the tape applying sections 262 is placed in fluid communication with a conventional vacuum source (not shown), such as a vacuum pump, by means of an associated conduit 273 (FIGS. 16 and 17). Each conduit 273 opens into a respective one of the chambers 267 by means of a port 274 while diametrically opposite ports 275 in the hub 261 selectively place the conduits 273 in fluid communication with a generally annular chamber 276 formed in the outer periphery of the main shaft 195 (FIG. 16). The chamber 276 is in turn in fluid communication with a radial bore or passage 277 (FIG. 16) and an axial bore 278 which is in turn coupled to a rotatable union 280. The rotatable union 280 is placed in fluid communication with the vacuum source (not shown) by means of a conduit 281. As is readily apparent from FIG. 17 of the drawing, during any time a securing tape T is presented to one of the tape applying sections 262, the vacuum drawn along the flow path defined by the elements 281, 280, 278, 277, 276, 275, 273, 274, the chamber 267 and the passages 270 draws the securing tape T into intimate engagement with the associated tape carrying surface 268. The vacuum is sufficient to hold the tape in the position illustrated in FIG. 17 with the adhesive coated surface directed away from the tape carrying surface 268. As the tape applying member 260 rotates in a counterclockwise direction as viewed in FIG. 17 in a manner to be described more fully hereafter. The adhesive contact between the securing tape T and an adjacent can C causes the progressive peeling of the securing tape T from the associated tape applying section 262 and the enwrapment thereof about the can wall portions 107, 114 (FIGS. 4 and 7), as will be more apparent hereafter.

After each securing tape T is applied to one of the cans C, an associated trailing one of the tape pressing sections 263 bears against the applied securing tape and urges the same into intimate relationship with the peripheral wall portions 107, 114, as is best illustrated by the lowermost tape pressing section 263 of FIG. 17. The pressing of the securing tapes T against the cans C is achieved by means of a resilient, arcuate cushion member 283 adhesively or otherwise secured to an outermost surface (unnumbered) of an arcuate member 284 fixed to an edge of the annular member 264 by a plurality of bolts, only one of which is illustrated and unnumbered in FIG. 16 of the drawing.

Drive means, generally referred to by the reference numeral 290 are provided for rotating the tape applying member 260 at double the rate of rotation of the main shaft 195 and the mechanisms 190 and 205 fixedly keyed thereto. The drive mechanism 290 is a planetary gear mechanism which includes an internally toothed ring gear 291 supported in concentric relationship to the main shaft 195 (FIG. 16) and in axial spaced relationship to the upstanding plate 122 by spacers 292. The ring gear 291 is preferably welded to the spacers 292 which are in turn welded to the upstanding plate 122 of the framework 120. The ring gear 291 is in meshing engagement with three identical equally arcuately spaced gears 293 of three identical planetary gear sets 294. Each planetary gear set 294 includes a shaft 295 suitably mounted in an associated aperture (unnumbered) of the plate 206. Each gear 293 is keyed to one end of an associated shaft 295 while another gear 296 is similarly fixed to an opposite end (unnumbered) of an associated one of each of the shafts 295. The three gears 296 are in turn in mesh with an externally toothed gear 297 which is welded or otherwise secured to the hub 261 of the tape applying member 260. The ratio of the gears 291, 293, 296 and 297 is such that for each complete revolution of the main shaft 195 or the plate 206 the tape applying member 260 is rotated two revolutions. The speed differential between the tape applying member 260 and the main shaft 195 permits a securing tape T to be applied completely about an associated can C during the rotation of the can holding turret 190 through approximately 90 degrees (FIG. 17) while during the remaining approximately 90 degrees of rotation of the can holding turrent 190 (between 90 degrees and 180 degrees) an associated one of the tape pressing sections 263 urges the securing tape T into intimate engagement with one of the cans C.

The discharge mechanism 100 (FIGS. 1, 2, 9 and 10) removes each taped can C from the tape applying mechanism 40 at the completion of the tape applying operation. The discharge mechanism 100 includes a paddle wheel 300 which is fixed to a shaft 301 rotatably mounted in journal blocks 302 which are in turn fixed to horizontal support members 303 of the framework 120 (FIG. 10). A sprocket 304 (FIGS. 9 and 10) is fixed to the shaft 301 and, as is best illustrated in FIG. 9 of the drawings, the main drive chain 151 is entrained about the sprocket 304 to impart counterclockwise rotation thereto as viewed in this latter figure. As each can is released by the can gripping mechanism 205 at the termination of the tape applying operation, the paddle wheel 300 contacts a lower portion of the associated can C and guides the same through a guide mechanism 310 which is formed by a plurality of guide bars 311. A cooling mechanism 312 is positioned above the guide mechanism 310 and directs cold air toward the assembled cans C to dissipate the heat. At this point each of the cans C corresponds to the can C illustrated in FIG. 5 of the drawings.

Reference is now made in particular to FIGS. 2, 8, 9 and 11 through 16 of the drawings, and the description of the tape forming mechanism 60 (FIG. 1) the feed mechanism 70, the shear mechanism 80 and the vacuum transfer mechanism 90. As is best illustrated in FIG. 8 of the drawings, the roll 61 of web material W is supported on the shaft 63 which is in turn journalled in a pair of brackets 305 only one of which is illustrated. The brackets 305 are in turn welded or otherwise fixed to upright supports 306, 307 (FIG. 9) which form a portion of the framework 120. The roll 65 includes a shaft 313 journalled in brackets 314, 315 (FIG. 9) secured to the respective upright supports 307, 306.

The roll 62 of strip material S is similarly supported by means of a single bracket 316 which is welded or otherwise secured to an uppermost portion of the vertical support 306 (FIGS. 8 and 9). The bracket 316 includes a sleeve 317 in which is journalled the shaft 64.

The strip S is wrapped about the longitudinal edge E of the web W by means of the forming mechanism 66 (FIG. 8) which includes a forming shoe 320 welded or otherwise secured to the support 311. The forming shoe 320 includes a relatively wide entrance end portion 321 which gradually converges to a narrower exit end portion 322. During the passage of the strip S through the forming shoe 320 the strip S is guided by the configuration of the shoe 320 into overlapped relationship to the longitudinal edge E in such a manner that the edge E is sandwiched between overfolded portions (unnumbered) of the strip S.

The surface of the strip S which is brought into overfolded contacting relationship to the longitudinal edge E of the web W is preferably though not necessarily provided with pressure sensitive adhesive which effectively secures the strip S to the web W during the passage of the strip S through the rolls 71, 72. The rolls 71, 72 (FIG. 8) are journalled by respective shafts 323, 324 to an upstanding arm 325 of a bracket 326 which is in turn welded or otherwise fixed to the upstanding support 311. The shaft 324 of the roll 72 rests in a yoke 327 of a member 328 slidably received in a sleeve 340. A spring 341 normally biases the yoke 327, the shaft 324 and the roll 72 upwardly toward the roll 71 to force the strip S into intimate adhesive contact with the longitudinal edge E of the web W.

The feed mechanism 70 for drawing the web and strip through the tape forming mechanism 60 includes a pair of rolls 344, 345 having respective reduced end portions 346, 347 (FIG. 11) and respective shafts 350, 351. The shaft 350 of the roll 344 is journalled for rotation in a pair of journal blocks 352, 353 fixed to the upstanding plate 122 of the framework 120. The shaft 351 of the roll 345 is similarly journalled for rotation in the journal blocks 352, 353. However, in addition to journalling the roll 345 for rotation about its axis, the journal blocks 352, 353 are identically constructed to permit the roll 345 to be moved toward and away from the roll 344 to facilitate the initial threading of the feed mechanism 70 and vary the forces urging the strip S into engagement with the longitudinal edge of the web W between the reduced end portions 346, 347 (FIG. 11).

The mechanism for moving the rolls 344, 345 relative to each other include a pair of fluid cylinders 362, 363 (FIG. 11) fixed to downwardly depending legs 364, 365 of the respective journal blocks 352, 353. The cylinders 362, 363 are identical and each includes a piston rod 366 which is reciprocated by the introduction and withdrawal of fluid into the piston chambers (not shown) by means of conduits 367. Upper end portions (unnumbered) of the piston rods 366 are fixed to a block 368 (FIG. 10) which is mounted for vertical movement in a vertical guideway 370 in each of the journal blocks 352, 353. The shaft 351 passes through a vertical slot 371 (FIG. 10) in each of the journal blocks 352, 353 and is freely rotatably received in a bore (not shown) of the block 368. The roll 345 is thereby effectively mounted for vertical movement in the journalling blocks 352, 353 and is freely rotatably received in each of the blocks 368.

When it is desired to urge the rolls 344, 345 of the feed mechanism 70 into intimate engagement the valve V (FIG. 1) in a conduit 375 between the conduits 367 and a source of compressed air or similar fluid media is opened and the air is introduced into the cylinders 362, 363 to raise the piston rods 366, the blocks 368 secured thereto, the shaft 351 and the roll 345. The rolls 344, 345 may be spaced by operating the valve V to vent the air from the cylinders 362, 363, to atmosphere through a conduit 376. The valve V is of a conventional construction but in lieu of admitting air to or bleeding air from the pistons 362, 363 it may be of any conventional adjustable type to vary the air pressure in the cylinders and thereby adjustably regulate the pressure between the rolls 344, 345.

The roll 344 is directly driven by a clutch mechanism, generally referred to by the reference numeral 380, while the roll 345 is driven directly by the roll 344 through normally meshed gears 381, 382 (FIG. 11) secured to the respective shafts 350, 351. The clutch mechanism 380 includes a housing 383 which is suitably mounted on the shaft 350. The clutch mechanism 380 is a conventional one-way clutch whereby rotation imparted to the housing 383 in one direction causes the shaft 350 to rotate in one direction while opposite rotation imparted to the housing 383 does not impart rotation to the shaft 350 and roll 344.

The shaft 350 of the feed mechanism 70 is intermittently rotated in a clockwise direction, as viewed in FIG. 13 of the drawings, by a pneumatic cylinder 386 housing a piston (not shown) and a piston rod 387. The cylinder 386 is secured to the upstanding plate 122 of the framework 120 and includes a conduit 375 (FIGS. 1 and 13) for introducing fluid into and withdrawing fluid from the cylinder 386 to actuate the piston rod 387. An upper end portion (unnumbered) of the piston rod 387 is secured to a bifurcated member 390 which is in turn pivotally attached to an arm 391. The arm 391 is fixed to the housing 383 of the clutch mechanism 380.

Each time the arm 391 is drawn downwardly by the piston rod 387, the clutch mechanism 380 rotates the roll 344 in a clockwise direction (FIG. 13) which in turn rotates the roll 345 in a counterclockwise direction through the intermeshed gears 381, 382 to advance a predetermined length of the assembled strip and web into the searing mechanism 80.

The feed mechanism 70 is operated intermittently in response to the detecting means 55 (FIG. 1) detecting the presence of a can C on the input conveyor mechanism 30 and the closing of a contact 388 (FIG. 1) of a switch 389 of the circuit 180. The switch 389 is secured by a bracket 392 (FIG. 8) to the upstanding plate 121 of the framework 120 beneath an end portion (unnumbered) of the main shaft 195 projecting outwardly of the journal 197. A cam roller 393 of the switch 389 is in rolling contact with a cam 394 (FIGS.

8 and 16) fixed to a hub 395 which is in turn keyed to the main shaft 195. The cam 39 has four lobes or high spots (unnumbered) which act against the cam rollers 393 to close the contact 388 which is normally maintained open by a spring (unnumbered).

The circuit 180 is energized from a suitable power supply to which the switch 178 is connected by a conductor 400 (FIG. 1). Another conductor 401 of the circuit 180 is connected to a solenoid 402 of a conventional solenoid operated valve mechanism 403, the latter being placed in fluid communication with the conduit 375 by means of a conduit 404. A conductor 405 is connected between the solenoid 402 and the contact 388 of the switch 389. A conductor 406 is connected between a terminal (unnumbered) of the switch 389 and the contact arm 179 of the switch 178. It will be noted that the switches 178, 389 of the circuit 180 are in series and any time either of the contacts 179, 388 are opened the solenoid 402 is inoperative and no air is supplied through the valve mechanism 403 to the cylinder 386, resulting in the cylinder 386 being inoperative so as not to operate clutch mechanism 380. The assembled web and strip are thus not advanced into the searing mechanism 80. However, when a can body contacts the switch arm 177 and closes the contact 179 simultaneously with the closing of the contact 388 by the cam 394 the solenoid 402 is energized to permit air introduction into the cylinder 386 through the conduits 375, 404 and 385 to draw the piston rod 387 and arm 391 downwardly resulting in the feeding of the assembled web and strip to the shearing mechanism 80 as was heretofore noted. In this manner the assembled strip and web are presented to the shearing mechanism 80 each time a can body C is detected by the detecting mechanism 55. However, in the absence of a can body C being detected by the detecting mechanism 55 operation of the feed mechanism 70 is prevented and a securing tape is not severed from the assembled strip and web, as will be more fully described hereafter.

The shearing mechanism 80 is in part supported by a base 411 (FIG. 8) which is welded to the plates 121, 122 of the framework 120. The base 411 is spaced beneath a pair of horizontal supports 412, 413 (FIG. 9) which are fixed at first ends thereof to the vertical supports 306, 307 respectively (FIG. 9). Opposite ends of the horizontal supports 413, 412 are fixed to vertical supports 414, 415 respectively (FIG. 11) which are in turn fixed to an upper end portion of the plate 121 (FIG. 8). A pair of angle bars 417, 418 (FIGS. 8, 11 and 13) span between and are attached to the supports 412, 413. The various components 411 through 418 thereby define a generally open housing positioned above the tape applying mechanism 40 in which the shearing mechanism 80 is substantially entirely housed.

The shearing mechanism 80 includes a shearing blade 420 (FIGS. 12 and 14) which is carried by a reciprocal slide 421. The blade 420 is secured by a plurality of bolts 422 to a bar 423 which is in turn secured by a plurality of bolts 424 (only one of which is illustrated) to the slide 421. Opposite ends of the slides 421 are provided with apertured collars 425 (FIG. 11) which receive an identical vertical post 426. The sleeves 425 and posts 426 function to accurately guide the slide 421 and the blade 420 carried thereby during the shearing of the securing tape from the assembled strip S and web W. The posts 426 are in turn fixedly secured, as by welding to a base plate 427 which is in turn secured to the horizontal plate 411 (FIG. 12). The base plate 427 is also provided with a slot, generally referred to by the reference numeral 430 (FIGS. 12 and 14) which includes a narrow slot portion 431 (FIG. 14) a wider slot portion 432 and a flared entrance portion 433 (FIG. 12). The slot 430 serves to guide the assembled strip and web toward a guide block 435 fixed to a forwardmost face (unnumbered) of the plate 427 by a plurality of bolts 436. The guide block 435 includes a relatively short upstanding wall 437 (FIG. 12) and a flange 438 overlying an upper guide surface 450 of the guide block 435. During each operation of the feed mechanism 70 the assembled sheet and web is fed from the position illustrated in FIG. 12 to a position at which the leading transverse edge (unnumbered) of the assembled strip and web engages or substantially engages the inner surface (unnumbered) of the upstanding wall 437. The shear 420 thereafter descends in a manner which will be more fully described hereafter to sever the assembled strip and web to form a securing tape T which momentarily rests upon the guide surface 450 of the guide block 435 prior to being transferred to the tape applying mechanism 40 by the vacuum transfer mechanism 90. It is to be noted that the guide surface 450 of the guide block 435 is slightly beneath the lowermost surface of the base plate 427 which defines the slot 430, as is best illustrated in FIG. 12 of the drawings. A lower surface 452 (FIG. 14) of the guide block 435 is relieved to expose a leading end portion of the severed tape T (FIG. 14) to the vacuum transfer mechanism 90, as will be more apparent hereafter.

The slide 421 of the shearing mechanism 80 is reciprocated by a pair of crank arms 455, 456 which are connected by identical pivot pins 457 to respective upstanding bifurcated brackets 458, 459 which are welded or otherwise secured to an upper surface (unnumbered) of the slide 421. The opposite ends of the crank arms 455, 456 are apertured to receive a central eccentric portion 461 of identical crank shaft 462, 463. Opposite end portions of the crank shafts 462, 463 are journalled in suitably bushed apertures of plates 464, 465 secured to the framework 120. A shaft 467 (FIG. 11) midway between the crank shaft 462, 463 is also suitably journalled between the plates 464, 465. Intermeshed gears 471, 472 and 473 are respectively keyed to the shafts 462, 467 and 463. As is readily apparent from FIG. 11 of the drawings, any rotation imparted to the shaft 467 will rotate the shafts 462 and 463 in an identical direction to reciprocate the crank arms 455, 456 simultaneously which will in turn reciprocate the slide 421 and the shear 420 to sever securing tapes T from the assembled strip and web in the manner heretofore described.

The shaft 467 is driven by a takeoff from the main chain drive 151 (FIG. 9). The main chain drive 151 is entrained about a sprocket 475 (FIGS. 9 and 13) which is in turn fixed to a shaft 476 journalled by journal blocks 477, 478 (FIG. 13) fixed to the plates 122, 121 of the framework 120. A sprocket 480 is fixed to the shaft 476 and an endless chain 481 is entrained about the sprocket 480 and a sprocket 482 fixed to the shaft 467. The chain 481 is also partially entrained about a sprocket 483 which is fixed to a shaft 484 in turn supported by journals 485, 486 fixed to the base plate 411.

Referring now to FIG. 9 of the drawings, the main drive chain 151 rotates the sprocket 475 in a counterclockwise direction, as viewed in this figure, which causes similar rotation to be imparted to the shaft 476. The rotation of the shaft 476 imparts clockwise rotation to the sprocket 480, as viewed in FIG. 2 of the drawings, which in turn rotates the sprocket 482 in the same direction by means of the chain 481. The gear 472 keyed to the shaft 467 thereby rotates each of the gears 471, 473 in an identical direction (counterclockwise in FIG. 2) to impart rotation to the crank shaft 462, 463, the arms 455, 456 and the shear blade 420. It is to be noted that the shear 420 is continuously rotated during the operation of the apparatus 20 and the only time a securing tape T is not formed is when the assembled web and strip is not fed by the rolls 344, 345.

The vacuum transfer mechanism 90 (FIGS. 1 and 14) includes a generally circular body 500 having a hub 501 (FIG. 16) keyed to the shaft 476. A generally annular groove 502 (FIG. 14) opens outwardly through a face (unnumbered) of the body 500 and a plurality of passages or ports 503 place the interior of the groove 502 in fluid communication with the exterior thereof through a tape carrying peripheral surface 504. An annular member 505 (FIG. 15) having a groove 506 in opposed relationship to the groove 502 is fastened to the body 500 by a plurality of identical bolts 507. Seals 508, 510 are positioned between the opposing faces of the body 500 and the annular member 505. In this manner the grooves 502, 506 define a generally annular vacuum chamber 511 of the mechanism 90.

The vacuum chamber 511 is placed in fluid communication with a conventional source of vacuum, such as a vacuum pump, by means of identical diametrically opposite bores 512 (FIGS. 14 and 16) in the annular member 505, identical conduits 513, a radial bore 515 in the shaft 476, an axial bore 515, a conventional rotatable union 516 and a conduit 517.

Assuming a vacuum is being continuously drawn over the flow path just described and the body 500 of the vacuum transfer mechanism 90 is rotating clockwise in FIGS. 1 and 14 of the drawings, a securing tape T (FIG. 14) sheared by the blade 420 drops upon the guide surface 450 of the guide block 435 and a leading end portion of the tape T is drawn into intimate engagement with the surface 504 and is progressively drawn off the guide block 435 until the tape rests entirely upon the surface 504 of the transfer mechanism 90. The body 500 of the transfer mechanism 90 is in alignment with the tape applying member 260, as is clearly illustrated in FIG. 16 of the drawings. As the leading edge of the security tape carried by the vacuum transfer mechanism 90 approaches one of the tape carrying sections 262 of the tape applying member 260 a stripper 525 (FIG. 17) secured to a portion of the framework 120 strips the leading edge of the securing tape from the surface 504. The strip leading end portion of the tape is substantially simultaneously drawn against the tape carrying surface 268 of the tape applying member 260 and is subsequently applied and pressed thereby against one of the cans C in the manner heretofore described. The speed of rotation of the tape applying member 260 as well as the vacuum produced to remove the securing tapes from the vacuum transfer mechanism 90 are both slightly greater than the speed and force of vacuum of the mechanism 90. This permits the securing tapes to be more readily drawn away from the vacuum transfer mechanism 90 and also tensions or attenuates the securing strips to prevent wrinkling thereof and attended misapplication to the can bodies C.

While a preferred embodiment of the invention has been described heretofore, modification therein will be apparent to those skilled in the art after having read this disclosure and are deemed a part thereof. For example, the closure 102 can be of a one-piece metal or plastic construction, and the container body 101 may similarly be constructed from plastic material. If the closure 102, the container body 101 and/or both are constructed from plastic material (polyethylene, etc.) it is undesirable to heat the assembled can body and closure to any but a very minimum extent or at times not at all. Thus, the heating mechanism may be moved further away from the assembled closure and container body C than as shown in FIG. 3 and/or the burners would be turned very low by conventional valve means (not shown). In order to melt the adhesive on the tape T a hot air heater 530 (FIGS. 1, 17 and 18) is conventionally supported adjacent the tape applying mechanism 40. Hot air from a conventional source (not shown) is conducted by a conduit 531 into a manifold 532 of the heater 530. The manifold 530 includes a plurality of openings 533 (FIG. 18) for diverting the hot air against the tape T, as is readily apparent from FIG. 17 of the drawing, to activate the adhesive thereon just prior to the application of the tape to the can and cover assembly. The heater 530 can, of course, be used when the closure and can body are both constructed of metallic material for exceptionally high speed operations.

It is also possible to house portions of the apparatus 20 in a sealed housing to either pressurize or evacuate the container bodies prior to the application of the tape T thereto. Once the adhesive sets the tape T forms a hermetic seal for the life of any particular product packaged within the containers.

From the foregoing, it will be seen that novel and advantageous provisions have been made for carrying out the desired end. However, attention is again directed to the fact that additional variations may be made in this invention without department from the spirit and scope thereof as defined in the appended claims.

I claim:

1. Apparatus for securing together a pair of assembled members having generally mutually coplanar adjoining peripheral wall portions comprising means for transversely removing a strip material member from a web, means for bringing the assembled members and the strip material member into contiguous relationship, means for applying an end of the strip material member against and progressively circumferentially wrapping the strip material member about the adjoining peripheral wall portions of the assembled members, means for securing a narrow strip to a longitudinal edge of said web prior to removing the strip material member therefrom whereby an end portion of the latter member defines a grip portion of said strip material member which is adapted to be grasped incident to the removal of the strip material member from the assembled members to disassemble the latter.

2. Apparatus for securing together a pair of assembled members having generally mutually coplanar adjoining peripheral wall portions comprising means for transversely removing a strip material member from a web, means for bringing the assembled members and the strip material member into contiguous relationship, means for applying an end of the strip material member against and progressively circumferentially wrapping the strip material member about the adjoining peripheral wall portions of the assembled members, means for securing a narrow strip in overfolded relationship to opposite surface portions of a longitudinal edge of said web prior to removing the strip material member therefrom whereby an end portion of the latter member defines a grip portion to be grasped incident to the removal of the strip material member from the assembled members to disassemble the latter.

3. The apparatus as defined in claim 1 wherein said means for bringing said members together includes means for moving said strip material member with the grip portion trailing.

4. The apparatus as defined in claim 2 wherein said means for bringing said members together includes means for moving said strip material member with the grip portion trailing.

5. Apparatus for securing together a pair of assembled members having generally mutually coplanar adjoining peripheral wall portions comprising means for transversely removing a strip material member from a web, means for bringing the assembled members and the strip material member into contiguous relationship, means for applying an end of the strip material member against and progressively circumferentially wrapping the strip material member about the adjoining peripheral wall portions of the assembled members, said means for bringing said members together includes means for detecting the presence of said assembled members, and means responsive to said detecting means for preventing the removal of a transverse strip material member from the web.

6. Apparatus for securing together a pair of assembled members having generally mutually coplanar adjoining peripheral wall portions comprising means for transversely removing a strip material member from a web, means for bringing the assembled members and the strip material member into contiguous relationship, means for applying an end of the strip material member against and progressively circumferentially wrapping the strip material member about the adjoining peripheral wall portions of the assembled members, said means for bringing said members together includes means for detecting whether said assembled members have been inadvertently disassembled, and means responsive to said detecting means for preventing the removal of a transverse strip material member from the web.

7. The apparatus as defined in claim 5 wherein said responsive means prevents the removal of a transverse strip material member from the web by at least temporarily discontinuing the operation of said removing means.

8. The apparatus as defined in claim 5 including means for advancing the web to the removing means, and said responsive means prevents the removal of a transverse strip material member from the web by at least temporarily discontinuing the operation of said advancing means.

9. Apparatus for securing a closure member to a can body member by a strip material member comprising means for transversely removing a strip material member from a web, means for advancing the members into contiguous relationship, means for applying the strip material member against and about adjoining peripheral wall portions of the closure and can body members, means for securing a narrow strip to a longitudinal edge of said web prior to removing the strip material member therefrom whereby an end portion of the latter member defines a grip portion of said strip material member which is adapted to be grasped incident to the removal of the strip material member from the peripheral wall portions to disassemble said closure and can body members.

10. The apparatus as defined in claim 9 including means for securably sandwiching said longitudinal edge of the web between overfolded portions of said narrow strip prior to removing the strip material member therefrom whereby an end portion of the latter member defines a grip portion to be grasped incident to the removal of the strip material member from the peripheral wall portions to disassemble said closure and can body members.

11. Apparatus for securing a closure member to a can body member by a strip material member comprising means for transversely removing a strip material member from a web, means for advancing the members into contiguous relationship, means for applying the strip material member against and about adjoining peripheral wall portions of the closure and can body members, means for detecting the presence of can body members, and means responsive to said detecting means for preventing the removal of a strip material member from the web.

12. Apparatus for securing a closure member to a can body member by a strip material member comprising means for transversely removing a strip material member from a web, means for advancing the members into contiguous relationship, means for applying the strip material member against and about adjoining peripheral wall portions of the closure and can body members, said strip material member includes a heat activatable adhesive surface which is brought into contact with said adjoining peripheral wall portions by said applying means, and means are provided for heating at least one of said members prior to the application of said strip material member to said peripheral wall portions.

13. Apparatus for securing a closure member to a can body member by a strip material member comprising means for transversely removing a strip material member from a web, means for advancing the members into contiguous relationship, means for applying the strip material member against and about adjoining peripheral wall portions of the closure and can body members, said strip material member is of a length greater than the circumference of said peripheral wall portions, and means are provided for applying means to an end portion of said strip material member to prevent the latter from adhering to an overlapped portion thereof upon the application of the strip material member to said closure and can body members.

14. Apparatus for securing a closure member to a can body member by a strip material member comprising means for transversely removing a strip material member from a web, means for advancing the members into contiguous relationship, means for applying the strip material member against and about adjoining peripheral wall portions of the closure and can body members, said strip material member is of a length greater than the circumference of said peripheral wall portions, and means are provided for applying means to a longitudinal edge of the web prior to the removal of the strip material member to prevent the latter from adhering to a lapped portion thereof upon the application of the strip material member to said closure and can body members.

15. The apparatus as defined in claim 9 wherein said removing means is a shear mechanism, means are provided for advancing the web relative to the shear mechanism, and means are provided for controlling the operation of the shear mechanism in dependence upon the presence of can body members being advanced by the associated advancing means.

16. Apparatus for securing a closure member to a can body member by a strip material member comprising means for transversely removing a strip material member from a web, means for advancing the members into contiguous relationship, means for applying the strip material member against and about adjoining peripheral wall portions of the closure and can body members, means are provided for advancing the web relative to the removing means, said web advancing means including a pair of rolls, means for rotating one of said rolls, and means maintaining said pair of rolls in driving relationship whereby rotation of said one roll imparts rotation to the other of said rolls to advance the web.

17. Apparatus for securing a closure member to a can body member by a strip material member comprising means for transversely removing a strip material member from a web, means for advancing the members into contiguous relationship, means for applying the strip material member against and about adjoining peripheral wall portions of the closure and can body members, said advancing means includes means for rotating said closure and can body members at least after the strip material member has been applied thereto, and means for pressing said strip material member into intimate relationship with said closure and can body members during the rotation thereof by said rotating means.

18. Apparatus for securing a closure member to a can body member by a strip material member comprising means for transversely removing a strip material member from a web, means for advancing the members into contiguous relationship, means for applying the strip material member against and about adjoining peripheral wall portions of the closure and can body members, said advancing means includes first means for conveying said closure and can body members along a predetermined path of travel after the strip material member has been applied thereto, second means for rotating said closure and can body members about the axes thereof during at least a portion of the movement along said predetermined path of travel, and means for pressing said strip material member into intimate relationship with said closure and can body members during the rotation thereof by said rotating means.

19. A mechanism for forming a strip material member particularly adapted for securing a pair of elements to one another by wrapping the strip material member against and about adjoining generally coaxial wall portions of the elements comprising means for advancing a web along a predetermined path of travel, means for securing a narrow strip to a longitudinal edge of said web, said securing means including means for longitudinally folding said narrow strip whereby said longitudinal edge is sandwiched between overfolded portions of said narrow strip, and means along said predetermined path of travel for transversely removing narrow transverse portions of the web and strip to form a strip material member having a finger gripping end portion defined by the removed portion of the strip.

20. The mechanism as defined in claim 19 wherein means are provided for subsequently advancing the strip material member beyond the removing means along a second predetermined path of travel, and said paths of travel having portions disposed generally tangential to each other.

21. The mechanism as defined in claim 19 wherein said advancing means includes a driven roll, means for intermittently driving said roll, and said driving means including clutch means coupled to said roll for rotating said roll in only one direction.

22. The mechanism as defined in claim 19 wherein said advancing means includes a pair of rolls defining a nip through which advance the web and strip, means for imparting rotation to said rolls and means for shifting said rolls away from each other to facilitate the introduction of the web and strip therebetween to effect the threading of the mechanism.

23. The mechanism as defined in claim 20 wherein said strip material member advancing means includes vacuum means for advancing said latter member along said last-mentioned path of travel.

24. The mechanism as defined in claim 20 wherein said strip material member advancing means advance the strip material member along said last-mentioned path of travel with the finger gripping end portion trailing.

25. A method of securing together a pair of assembled members having generally mutually coplanar adjoining peripheral wall portions comprising the steps of providing a sheet material web, severing a strip material member from the web, applying the strip material member against and about the adjoining peripheral wall portions of the assembled members, and tensioning the strip material member prior to the application thereof to the adjoining peripheral wall portions of the assembled members.

26. A method of securing together a pair of assembled members having generally concentric adjoining peripheral wall portions comprising the steps of providing a sheet material web of a predetermined width, transversely severing a strip material member from the web, applying the strip material member against and about the adjoining peripheral wall portions of the assembled members, securing a narrow strip in overfolded relationship to opposite surface portions of a longitudinal edge of the web prior to severing the strip material member therefrom whereby an end portion of the latter member defines a grip portion to be grasped incident to the removal of the strip material member from the assembled members to disassemble the latter.

27. The method of securing together a pair of assembled members as defined in claim 26 including the step of tensioning the strip material member during the application thereof to the adjoining peripheral wall portion of the assembled members.

28. The method of securing together a pair of assembled members as defined in claim 25 wherein the length of the severed strip material member is longer than the peripheral extent of the peripheral wall portions resulting in an overlap of the strip material member when applied to the assembled members, the added step of preventing overlapped portions of the strip material member from adhering together.

29. Apparatus for securing together a pair of assembled members having generally mutually coplanar adjoining peripheral wall portions comprising means for transversely removing a strip material member from a web, means for bringing the assembled members and the strip material member into contiguous relationship, means for applying the strip material member against and about the adjoining peripheral wall portions of the assembled members, forming a thickened grip portion along a longitudinal edge of the web prior to the removal of the strip material member therefrom whereby the strip material member includes an end having a thickened grip portion, and means for conveying the strip material member with the grip portion thereof trailing incident to the application thereof to the assembled members.

30. Apparatus for securing together a pair of assembled members having generally mutually coplanar adjoining peripheral wall portions comprising means for transversely removing a strip material member from a web, means for bringing the assembled members and the strip material member into contiguous relationship, means for applying the strip material member against and about the adjoining peripheral wall portions of the assembled members, said removing means includes a rotatable vacuum having an axis of rotation generally parallel to the longitudinal axis of said web.

31. The apparatus as defined in claim 29 wherein said means for bringing said members together includes means for detecting the presence of said assembled members, and means responsive to said detecting means for preventing the removal of a transverse strip material member from the web.

32. Apparatus for securing together a pair of assembled members having generally mutually coplanar adjoining peripheral wall portions comprising means for transversely removing a strip material member from a web, means for bringing the assembled members and the strip material member into contiguous relationship, means for applying the strip material member against and about the adjoining peripheral wall portions of the assembled members, means for advancing the web to the removing means for detecting the presence of can body members, and means responsive to said detecting means for preventing the removal of a strip material member from the web.

33. The apparatus as defined in claim 29 including means for tensioning the strip material member during the application thereof to the adjoining peripheral wall portions of the assembled members.

34. The apparatus as defined in claim 1 wherein said means for bringing said members together includes means for detecting the presence of said assembled members, and means responsive to said detecting means for preventing the removal of a transverse strip material member from the web.

References Cited
UNITED STATES PATENTS

| | | | |
|---|---|---|---|
| 2,130,775 | 9/1938 | Neumair | 53—73X |
| 2,682,909 | 7/1954 | Claff et al. | 93—1EX |
| 2,731,778 | 1/1956 | Loufek | 53—133 |
| 2,857,722 | 10/1958 | Smith | 53—216X |
| 2,938,319 | 5/1960 | Nystrand | 53—214 |
| 2,952,105 | 9/1960 | Schur | 53—216X |
| 3,248,843 | 5/1966 | Winters et al | 53—141X |
| 3,250,278 | 5/1966 | Rudszinat et al | 156—568X |
| 2,590,128 | 3/1952 | Sandberg | 53—234X |
| 2,773,617 | 12/1956 | Weiss | 156—568X |
| 2,791,873 | 5/1957 | Collins | 53—389X |
| 3,146,152 | 8/1964 | Seragnoli | 156—519 |

THERON E. CONDON, Primary Examiner

N. ABRAMS, Assistant Examiner

U.S. Cl. X.R.

53—73, 133, 139.3; 93—1; 156—467, 468; 220—53